United States Patent
Li et al.

(10) Patent No.: US 9,195,393 B1
(45) Date of Patent: Nov. 24, 2015

(54) CUSTOMIZABLE VIRTUAL DISK ALLOCATION FOR BIG DATA WORKLOAD

(71) Applicant: VMware, Inc., Palo Alto, CA (US)

(72) Inventors: Xinhui Li, Beijing (CN); Luke Lu, Palo Alto, CA (US); Sheng Lu, Beijing (CN)

(73) Assignee: VMware, Inc., Palo Alto, CA (US)

( * ) Notice: Subject to any disclaimer, the term of this patent is extended or adjusted under 35 U.S.C. 154(b) by 77 days.

(21) Appl. No.: 14/290,992

(22) Filed: May 30, 2014

(51) Int. Cl.
*G06F 12/02* (2006.01)
*G06F 3/06* (2006.01)
*G06F 12/08* (2006.01)

(52) U.S. Cl.
CPC ............ *G06F 3/0604* (2013.01); *G06F 3/0631* (2013.01); *G06F 3/0643* (2013.01); *G06F 3/0664* (2013.01); *G06F 3/0667* (2013.01); *G06F 3/0689* (2013.01); *G06F 12/0223* (2013.01); *G06F 12/08* (2013.01); *G06F 2212/1012* (2013.01); *G06F 2212/151* (2013.01); *G06F 2212/152* (2013.01); *G06F 2212/21* (2013.01); *G06F 2212/657* (2013.01)

(58) Field of Classification Search
CPC ... G06F 3/0604; G06F 3/0631; G06F 3/0643; G06F 3/0667; G06F 3/0689; G06F 12/08; G06F 12/0223; G06F 2212/1012; G06F 2212/151; G06F 2212/152; G06F 2212/21; G06F 2212/657
See application file for complete search history.

(56) References Cited

U.S. PATENT DOCUMENTS

| | | | | |
|---|---|---|---|---|
| 2008/0263306 | A1* | 10/2008 | Tanizawa | G06F 3/0608 711/170 |
| 2009/0292870 | A1* | 11/2009 | Sambe | G06F 11/2087 711/114 |
| 2011/0138383 | A1* | 6/2011 | Le | G06F 9/5077 718/1 |
| 2015/0186060 | A1* | 7/2015 | Kurtin | G06F 3/0619 711/114 |
| 2015/0261561 | A1* | 9/2015 | Ashok | G06F 9/45558 718/1 |

OTHER PUBLICATIONS

"Amazon Elastic MapReduce", Retrieved from the <URL: http://aws.amazon.com/elasticmapreduce/> on Mar. 4, 2014.
Matei Zaharia et al., "Improving MapReduce Performance in Heterogeneous Environments", 8th USENIX Symposium on Operating Systems Design and Implementation, 2008, pp. 29-42.
Shadi Lbrahim et al., "CLOUDLET: Towards MapReduce Implementation on Virtual Machines", in Proceedings of the 18th ACM International Symposium on High Performance Distributed Computing, Jun. 11-13, 2009, pp. 65-66.
Aravind Menon et al., "Diagnosing Performance Overheads in the Xen Virtual Machine Environment", the First ACM/USENIX Conference on Virtual Execution Environments (VEE), Jun. 11-12, 2005.

(Continued)

*Primary Examiner* — Hiep Nguyen

(57) ABSTRACT

An example method to allocate a virtual disk for a virtual machine in a virtualized computing system includes allocating a plurality of virtual machine disk file (VMDK) candidates in a virtual machine file system (VMFS) volume, selecting a subset of VMDK candidates from the plurality of VMDK candidates for having performance scores indicative of higher I/O throughputs associated with the one or more physical hard disks than rest of the plurality of VMDK candidates, and configuring the virtual disk based on the subset of the VMDK candidates. The VMFS volume is supported by one or more physical hard disks in a storage system in the virtualized computing system.

24 Claims, 5 Drawing Sheets

(56) References Cited

OTHER PUBLICATIONS

Shadi Lbrahim et al., "Evaluating MapReduce on Virtual Machines: The Hadoop Case", in Proceedings of the 1st International Conference on Cloud Computing, 2009, pp. 519-528.

Fan Chung et al., "Maximizing Data Locality in Distributed Systems", Journal of Computer and System Sciences, Dec. 2006, pp. 1309-1316, vol. 72, Issue 8.

Balaji Palanisamy et al., "Purlieus: Locality-Aware Resource Allocation for MapReduce in a Cloud", in Proceedings of SC, Nov. 12-18, 2011, vol. 11.

"Project Serengeti", Retrieved from the <URL: http://www.projectserengeti.org/> on May 29, 2014.

"VMware vSphere Storage Appliance Technical Deep Dive", Technical Papers, Latest Revision on Dec. 15, 2011, Available at <URL: http://www.vmware.com/files/pdf/techpaper/VM-vSphere-Storage-Appliance-Deep-Dive-WP.pdf#sthash.iysA9XjJ.dpuf>.

* cited by examiner

CUSTOMIZABLE VIRTUAL DISK ALLOCATION FOR BIG DATA WORKLOAD

BACKGROUND

Hadoop typically is used for processing large data sets across clusters of independent machines, and it has become one of the leading "big data" platforms for storing large quantities of unstructured data and supporting a range of tools and analytic functions.

Existing approaches to deploy virtualized Hadoop systems have certain limitations. For instance, Amazon Elastic MapReduce (EMR) is a web service that uses Hadoop to distribute data and processing across a resizable cluster of Amazon Elastic Compute Cloud (EC2) instances. However, Amazon EMR does not provide ways for users to customize deployment of Hadoop clusters or control allocation of underlying resources, leading to undesirable inefficiencies. In addition, due to the characteristics of the underlying physical storage systems in a virtualized computing system and how virtual disks are generally allocated, it has been observed that data I/O access (e.g., writing efficiency) in such a virtualized computing system, especially for big data, has not been fully optimized. Specifically, one example physical storage system may utilize rotational disk drives. The tracks on different areas of the surface of such a disk drive provide different I/O throughputs. Because of the longer radius, an outer track (corresponding to low logical block addresses (LBAs)) of the disk drive has a higher I/O throughput than an inner track (corresponding to high LBAs). However, existing approaches still fail to effectively utilize the tracks associated with higher I/O throughput, because the approaches may focus instead on preventing contention among hosts in a virtualized computing system.

DETAILED DESCRIPTION

Figure 1:
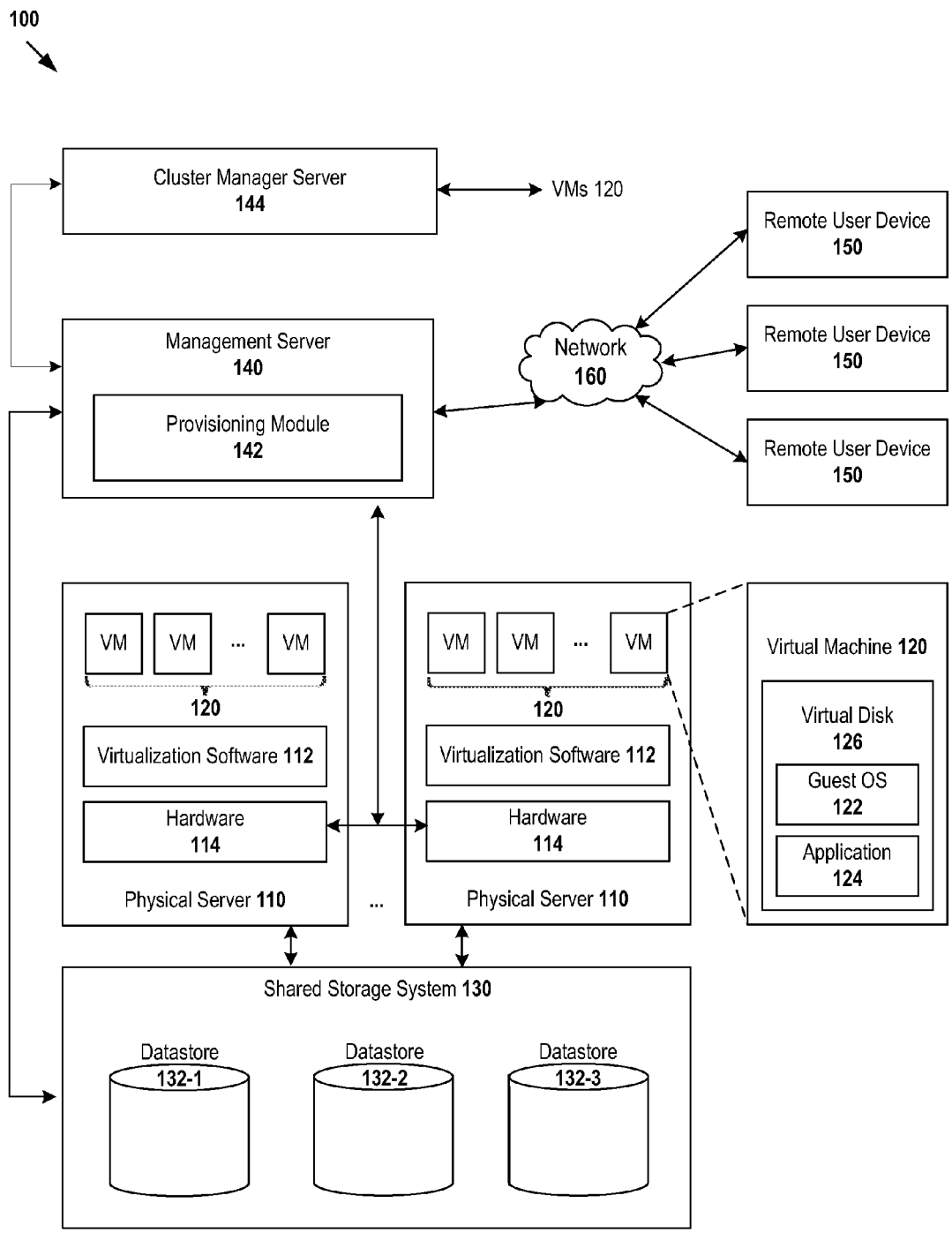
FIG. 1 a schematic diagram illustrating an example virtualized computing environment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated herein.

Achieving high efficiency of I/O accesses in a virtualized computing environment is one of the keys objectives in deploying big-data services in such an environment. Techniques for customizing the allocation of virtual disks for virtual machines (VMs), especially the VMs that handle big data workloads (e.g., Hadoop VMs), are disclosed herein.

FIG. 1 is a schematic diagram illustrating an example virtualized computing environment 100 in accordance with one or more embodiments of the present disclosure. Although one example is shown, it should be understood that virtualized computing environment 100 may include additional or alternative components, and may have a different configuration. Virtualized computing environment 100 includes physical servers 110 (also known as "hosts") that each execute virtualization software 112 (e.g., hypervisor) and include suitable hardware 114 to support multiple VMs 120.

Virtualized computing environment 100 further includes management server 140 (e.g., VMware vCenter Server™), which may be accessed by remote user devices 150 via network 160. Management server 140 provides a range of services, such as VM provisioning via provisioning module 142 and others. Remote user devices 150 may be operated by any suitable users, such as system administrators, organization administrators, database users, application developers, system architects, etc.

To deploy, run, and manage Hadoop workloads, virtualized computing environment 100 also includes cluster management server 144 (e.g., VMware Serengeti™ Management Server), which makes requests to management server 140 to carry out various actions, such as instantiating a VM from a template (not shown). The template generally contains an agent process that starts in the guest operating system (OS) of a VM when the VM conforming to the template is started up. This agent may be utilized for customization of the guest OS as well as for installation and configuration of the Hadoop role that the VM supports. One or more of VMs 120 may be a Hadoop VM. Cluster management server 144 also communicates with VMs 120.

Virtualization software 112 also maintains a mapping between virtual resources and physical resources of physical server 110, such as CPU resources (e.g., processors), memory resources (e.g., random access memory) and network resources (e.g., access networks). VMs 120 are also provisioned with storage resources, such as in the form of shared storage system 130 having multiple datastores 132-1 to 132-3 (collectively referred to as "datastores 132" or individually as a general "datastore 132").

The term "datastore" may broadly refer to a logical container that hides specifics of the underlying storage resources to provide a uniform model for storing VM data. Datastore 132 may each represent a formatted file system that physical servers 110 mount and share. For example, the file system may be a cluster file system that supports virtualization, such as Virtual Machine File System (VMFS) and Network File System (NFS) provided by network attached storage (NAS), etc. Although one or more VMFS volumes may correspond to one datastore, especially for big data workload and for performance consideration, in one embodiment, one VMFS volume may correspond to one datastore.

Each VM 120 may support guest OS 122 and at least one application 124 (e.g., database instance). When creating VM 120, a certain amount of storage resources is also allocated to VM 120. In particular, virtual disk 126 is created for VM 120 to store data (e.g., files) of VM 120. The term "virtual disk" 126 may generally refer to file or files on a file system that appear as a single hard disk to guest operating system 122. Virtual disk 126 is also known as virtual machine disk (VMDK).

Figure 2:
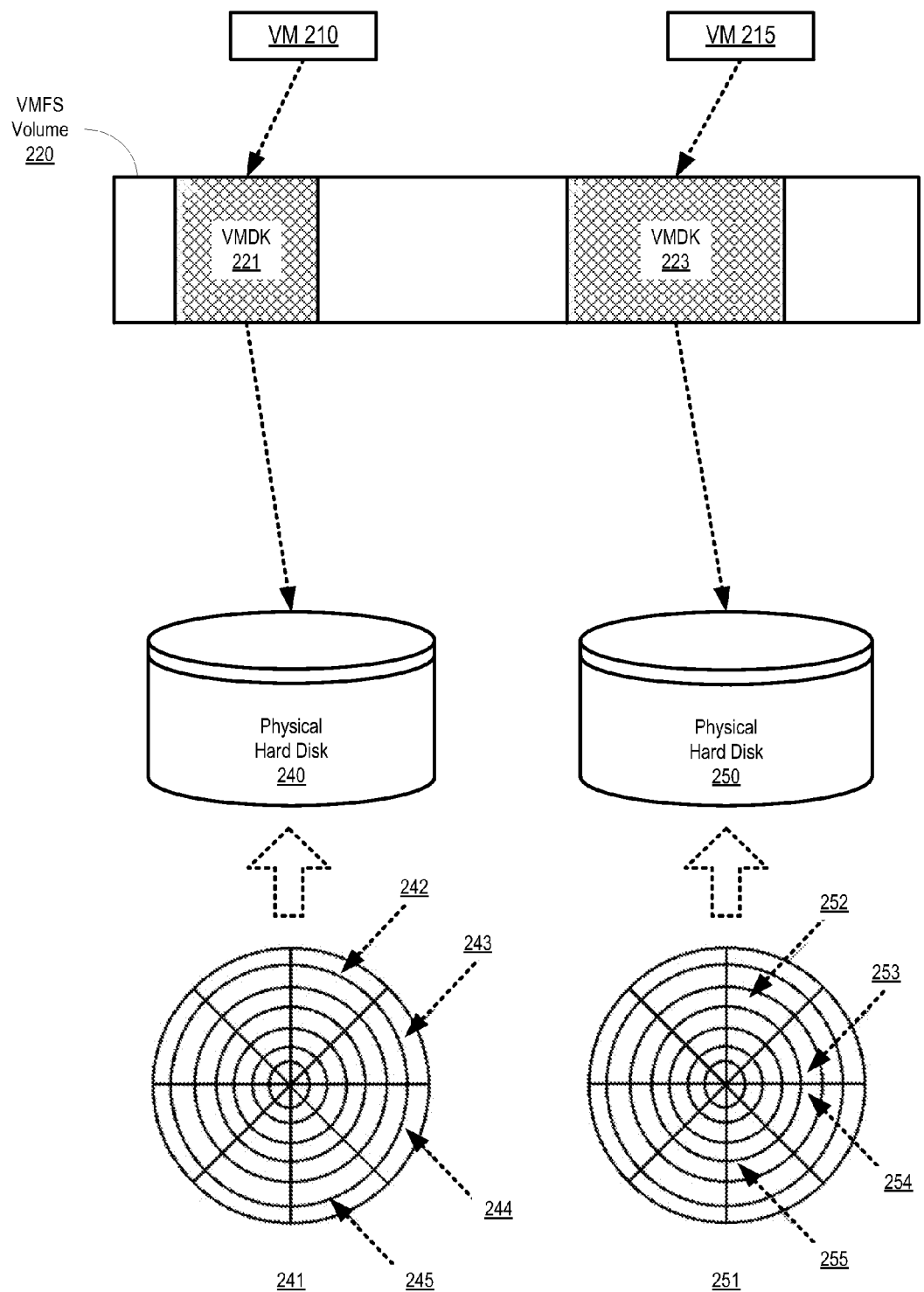
FIG. 2 illustrates example mappings between a VMFS volume and multiple VMDK files and between the VMDK files and physical hard disks.

FIG. 2 illustrates example mappings between a VMFS volume and multiple VMDK files and between the VMDK files and physical hard disks, in accordance with one or more embodiments of the present disclosure. VM 210 and VM 215 in FIG. 2 may correspond to any two VMs 120 that are shown in FIG. 1, and their respective VMDK files, VMDK 221 and VMDK 223, respectively, may also correspond to virtual disks 126 of the two VMs 120. VMFS volume 220 includes these VMDK files and may correspond to one of the datastores in shared storage system 130 of FIG. 1. VMFS volume 220 also maps to multiple physical hard disks, such as physical hard disks 240 and 250.

In one embodiment, physical hard disks 240 and 250 may be rotational disk drives containing one or more physical platters, each of which is configured to rotate around a center axis during operation. For example, physical hard disk 240 may contain disk platter 241 having multiple tracks. A "track" may refer to a concentric, non-overlapping circular path on the surface of disk platter 241. Each track may be used to store bits of data, and may be read or written when a head of a disk arm passes through the track. Further, each track may contain one or more sectors (e.g., sectors 242, 243, 244, and 245), and each sector may contain multiple fixed-length segments or blocks.

The tracks on disk platter 241 may have different distances from the center axis of physical hard disk 240. In other words, some of the tracks may be further away from the center axis than other tracks. For any two tracks, the one that is further away from the center axis may be deemed an "outer" track, while the other one may be deemed an "inner" track. Thus, the term "inner" may refer to a radial distance that is closer to the center axis. In comparison, the term "outer" may refer to a radial distance that is further away from the center axis. In some situations, the terms "inner" and "outer" may be relative, as a first track may be an inner track compared to a second track, and an outer track compared to a third track. Further, for each disk platter 241, there may be an inner-most track and an outer-most track.

Since the circumference of an outer track is longer than the circumference of an inner track, more fixed-length blocks may be allocated in the outer track than in the inner track. In a single rotation, the head of the disk arm may read one outer track or one inner track. Thus, more blocks may be read from the outer track than from the inner track during the same amount of time. As a result, the outer track may provide a higher data throughput than the inner track.

One way to access physical hard disks 240 and 250 is to address sectors in the hard drive. Specifically, logical block addressing (LBA) is a method to access a drive by linearly addressing sector addresses, beginning at sector 1 of head 0, cylinder 0 as LBA 0, and proceeding on in sequence to the last physical sector on the drive. Thus, the illustrated sectors located on the outer tracks (e.g., sectors 242, 243, 244, and 245) correspond to lower LBAs, and the sectors located on the inner tracks (e.g., sectors 252, 253, 254, and 255) correspond to higher LBAs.

Thus, VM 210, which accesses the sectors associated with lower LBAs (e.g., storage sectors 242, 243, 244 and 245), may achieve a higher I/O throughput than VM 215, which accesses the sectors associated with higher LBAs (e.g., sectors 252, 253, 254, and 255). In other words, one way to improve the performance of a virtualized Hadoop system is to identify which of the VMDK files may be associated with higher I/O throughputs and allocate these high-performance VMDKs to the virtual disks of the Hadoop VMs. It should be apparent to a person skilled in the art to recognize that other addressing schemes can be utilized to access physical hard disks.

Figure 3:
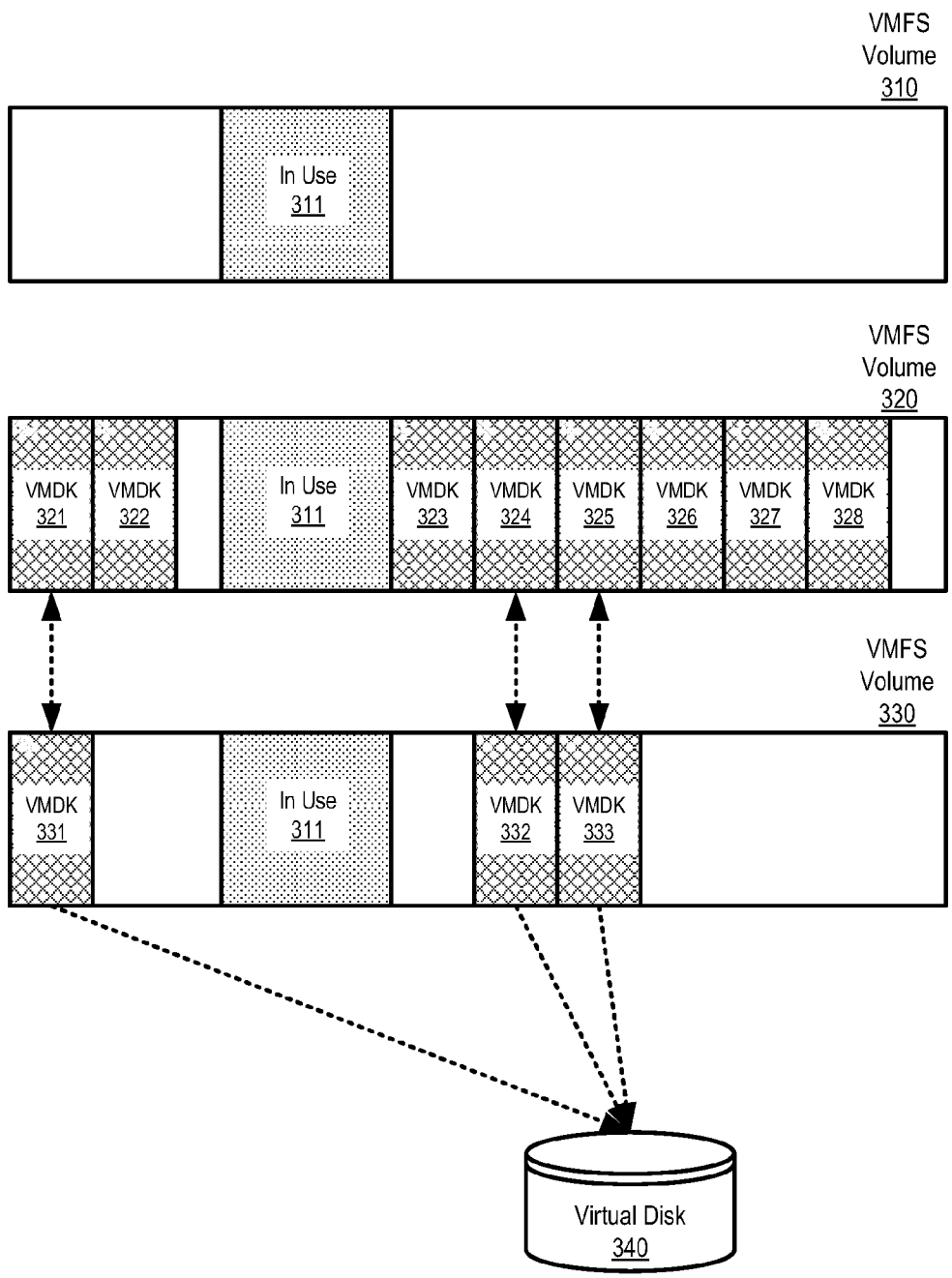
FIG. 3 illustrates simplified block diagrams of allocating a virtual disk of a Hadoop VM.

FIG. 3 illustrates simplified block diagrams of allocating virtual disk 340 of a Hadoop VM, in accordance with one or more embodiments of the present disclosure. In conjunction with FIG. 1, suppose cluster management server 144 has selected one physical server 110 with sufficient resources to execute the Hadoop VM (e.g., any of VMs 120). In one embodiment, cluster management server 144 sends a request to management server 140 to clone from a template and to configure the resulting VM.

In one embodiment, to differentiate between allocating the virtual disk of a Hadoop VM and allocating the virtual disk of a non-Hadoop VM, management server 140 may be configured to support different virtual disk allocation policies depending on the value of a configuration parameter such as "VMDKPolicy." If a big-data VM is intended, then the VMDKPolicy parameter may be set to "Enabled." For other types of VMs, the VMDKPolicy parameter may instead be set to "Disabled." When the VMDKPolicy parameter indicates "Disabled," management server 140 may support a virtual disk allocation policy that does not focus on optimizing the I/O throughputs associated with any of the VMDK files being allocated. On the other hand, when the VMDKPolicy parameter indicates "Enabled," management server 140 may support a different virtual disk allocation policy, as detailed in subsequent paragraphs.

During the creation and initialization phase of the Hadoop VM, the virtual disk of the Hadoop VM (e.g., virtual disk 340) may also be allocated. After an available VMFS volume (e.g., VMFS volume 310) with sufficient storage space is identified to support the requirements of virtual disk 340, in one embodiment, management server 140 may proceed to provision same-sized VMDK candidates until all of the free space on VMFS volume 310 is taken up. It should be noted that virtual disk 340 will be created from one or more of these VMDK candidates. Each "VMDK candidate" may correspond to a section of the storage space on VMFS volume 310. For example, VMFS volume 320 shows the provision/allocation outcome of VMFS volume 310. All of VMDK candidates 321, 322, 323, 324, 325, 326, 327, and 328 may have the same size, which may be configurable based on a configuration parameter "DeltaSize." In other words, each of the VMDK candidates 321, 322, 323, 324, 325, 326, and 327 may have a size that is equal to DeltaSize. The larger the value of DeltaSize is, the less number of VMDK candidates may be provisioned from the VMFS volume 310. DeltaSize may be tuned into finer granularity via management server 140 to determine the appropriate number of VMDK candidates to be provisioned and evaluated.

In one embodiment, management server 140 may choose a subset of candidates from VMDK candidates 321, 322, 323, 324, 325, 326, 327, and 328 based on certain criteria. Specifically, management server 140 may include a ranking module, which is configured to evaluate each of the VMDK candidates based on one or more performance measurements.

In one embodiment, the ranking module may generate a performance score for each VMDK candidate, and the performance score is based on where data is stored in the underlying physical hard disk. For example, if the underlying physical storage devices for VMDK candidates support LBA, then as discussed above, the VMDK candidate with the lowest LBA value would also have the highest I/O throughput.

In one embodiment, the ranking module may utilize a specific function (e.g., getLBA( )) supported by shared storage system 130 of FIG. 1 to get the relevant LBA values for each of the VMDK candidates. Each VMDK file may correspond to N blocks in its corresponding physical hard disk. $Add_i$ corresponds to the address of the $i^{th}$ block. One example formula to determine the performance score of a VMDK candidate may be expressed as Equation (1) below:

$$\text{Performance Score} = (\text{Sum of } Add_i)/N \quad \text{Equation (1)}$$

As discussed above and in conjunction with Equation (1), a higher performance score indicates that the data of the VMDK candidate are located on the slower tracks of the physical hard disk, and conversely, a lower performance score indicates that the data of the VMDK candidate are located on the faster tracks.

After the ranking module determines a performance score for each of the VMDK candidates, it may select a subset of the VMDK candidates from all the VMDK candidates for virtual disk 340. The number of the VMDK candidates M to be selected (also referred to as the size of the subset) may be depended on the required size of virtual disk 340 as well as the parameter DeltaSize. For example, assuming the required size of virtual disk 340 required size is S, the number M may be calculated based on Equation (2) below:

$$M = (S/\text{DeltaSize}) \quad \text{Equation (2)}$$

In FIG. 3, the ranking module may determine that the number M for the virtual disk 340 is "3." In this case, the virtual storage manager may select from the VMDK candidates 321, 322, 323, 234, 325, 326, 327, and 328 three VMDK candidates that have the lowest performance scores, corresponding to the highest I/O throughputs (e.g., selected VMDK candidates 321, 324, and 325).

In one embodiment, manager server 140 may then release all the other VMDK candidates that are not selected by the ranking module for virtual disk 340. In FIG. 3, VMFS volume 330 corresponds to the outcome of releasing the unselected VMDK candidates from VMFS volume 320. In other words, selected VMDK candidates 331, 332, and 333 of the VMFS volume 330 may correspond to selected VMDK candidates 321, 324, and 325 of the VMFS volume 320. In one embodiment, management server 140 may release and reallocate selected VMDK candidates 331, 332, and 333 into a unified VMDK file and then assign the unified VMDK file to virtual disk 340.

In another embodiment, the ranking module may calculate the performance scores of the VMDK candidates by measuring the run-time performance of these VMDK candidates. Specifically, management server 140 may first mount each of the VMDK candidates to a testing virtual disk in a target VM. Afterward, the ranking module may initialize and execute a test application on the target VM. The test application may perform I/O operations to access the testing virtual disk and collect performance measurements (e.g., I/O throughputs) of these storage operations during run time. The ranking module may then convert the measurement values collected by the test application into a performance score for the VMDK candidate. Then, management server 140 may unmount the VMDK candidate and mount another VMDK candidate to the testing virtual disk so that another set of performance measurements may be collected. Once all the VMDK candidates are measured, management server 140 may then select the M number of VMDK candidates that have the performance scores indicative the highest I/O throughputs among all the VMDK candidates, release the unselected VMDK candidates, and reallocate the selected VMDK candidates into one unified VMDK for virtual disk 340. Alternatively, management server 140 may mount all the VMDK candidates to a test virtual disk in a target VM. The performance measurements are generated and collected in parallel, and based on the collected performance measurements, management server 140 selects, releases, and reallocates as discussed above.

In one embodiment, management server 140 may tune the performance of virtual disk 340 by adjusting the parameter DeltaSize according to different types of applications that may utilize virtual disk 340. For example, for big-data applications, DeltaSize may be set to 16 GB or increments of 16 GB. It should be noted that a small DeltaSize may cause management server 140 to allocate a large number of VMDK candidates in the VMFS volume, which may in turn require a lot of resources to evaluate these VMDK candidates. In comparison, a DeltaSize that is too large may cause loss of accuracy in finding the best performing VMDK candidates.

Figure 4:
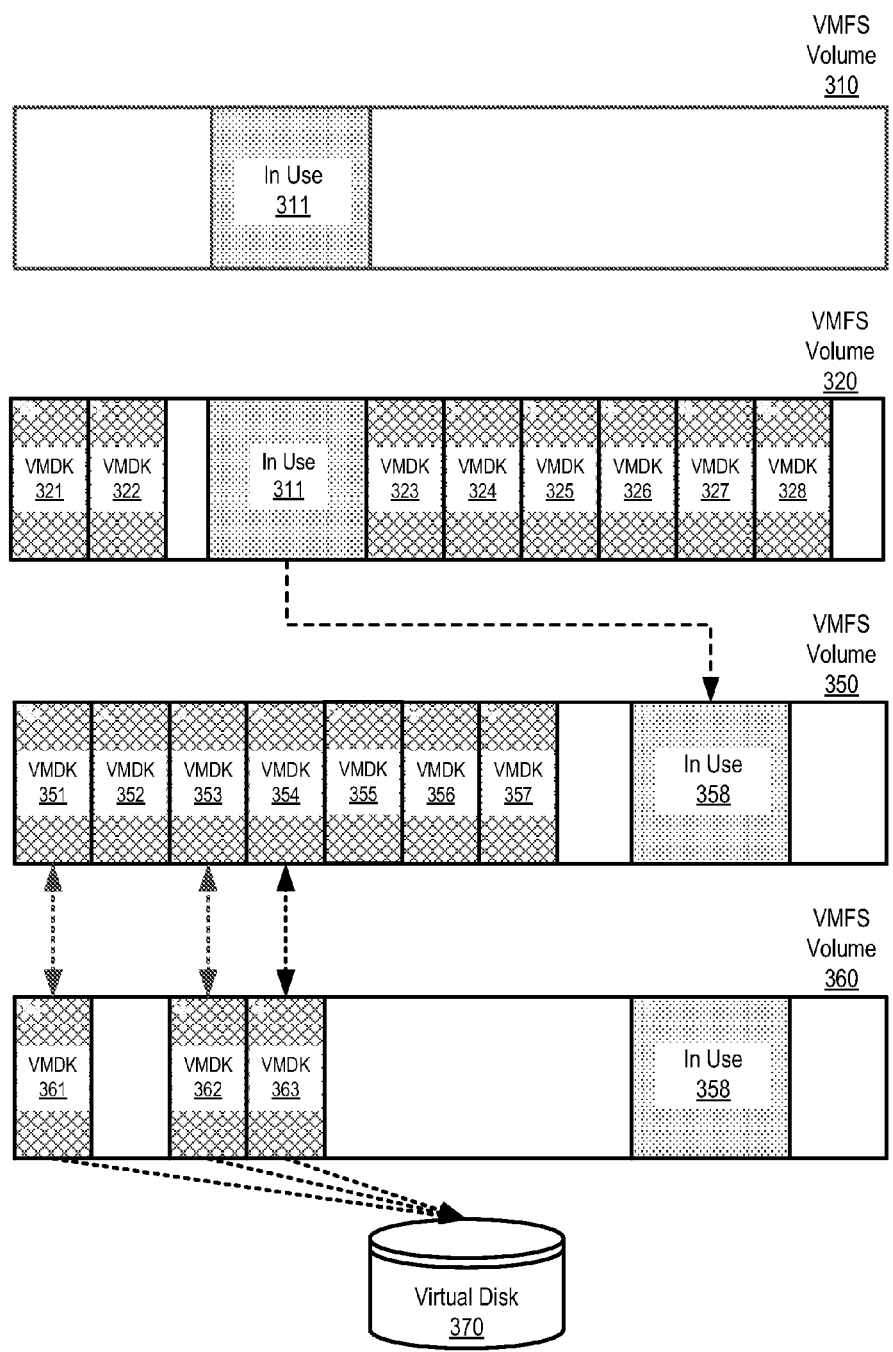
FIG. 4 illustrates simplified block diagrams of relocating an in-use VMDK file in a VMFS volume and allocating a virtual disk of a Hadoop VM.

FIG. 4 illustrates simplified block diagrams of relocating in-use VMDK file 311 in a VMFS volume and allocating virtual disk 370 of a Hadoop VM, in accordance with one or more embodiments of the present disclosure. In conjunction with FIG. 1 and FIG. 3, management server 140 may be configured to treat in-use VMDK file 311 in VMFS volume 310 as a VMDK candidate. The ranking module of management server 140 may calculate a performance score for in-use VMDK file 311, similar to the performance scores for all the VMDK candidates as discussed above. Then, the ranking module may compare in-use VMDK file 311 against all the VMDK candidates. If in-use VMDK file 311 is determined to have a performance score indicative of a higher I/O throughput than some of the other VMDK candidates' performance scores (e.g., VMDK candidates 326 and 327 in VMFS volume 320), the ranking module may relocate in-use VMDK file 311 to another area of VMFS volume 310.

By releasing VMDK candidates 326 and 327, management server 140 may proceed to allocate a replacement VMDK (e.g., replacement VMDK 358) that utilizes the same underlying physical hard disks previously associated with VMDK candidates 326 and 327. The size of the newly allocated replacement VMDK 358 may be the same as or more than the size of in-use VMDK file 311. Management server 140 may copy data stored in in-use VMDK file 311 to place the copied data in replacement VMDK 358 before releasing in-use VMDK file 311, resulting in VMFS volume 350, in which replacement VMDK 358 is marked as "in use."

After in-use VMDK file 311 is relocated, the space originally occupied by in-use VMDK file 311 in VMFS volume 350 becomes available to support the VMDK candidate selection process described above. For example, management server 140 may determine a DeltaSize and allocate multiple VMDK candidates 351, 352, 353, 354, 355, 356, 357 in VMFS volume. After the ranking module calculates a corresponding performance score for each of VMDK candidates 351-357, the ranking module may identify and select a subset of the VMDK candidates having the performance scores indicative of the highest I/O throughputs (e.g., selected VMDK candidates 351, 353, and 354). Management server 140 may then release the rest of the unselected VMDK candidates, resulting in VMFS volume 360, in which selected VMDK candidates 361, 362, and 363 correspond to selected VMDK candidates 351, 353, and 354 of the VMFS volume 350. Management server 140 may then reallocate selected VMDK candidates 361, 362, and 363 into a unified VMDK and assign the unified VMDK to virtual disk 370.

Figure 5:
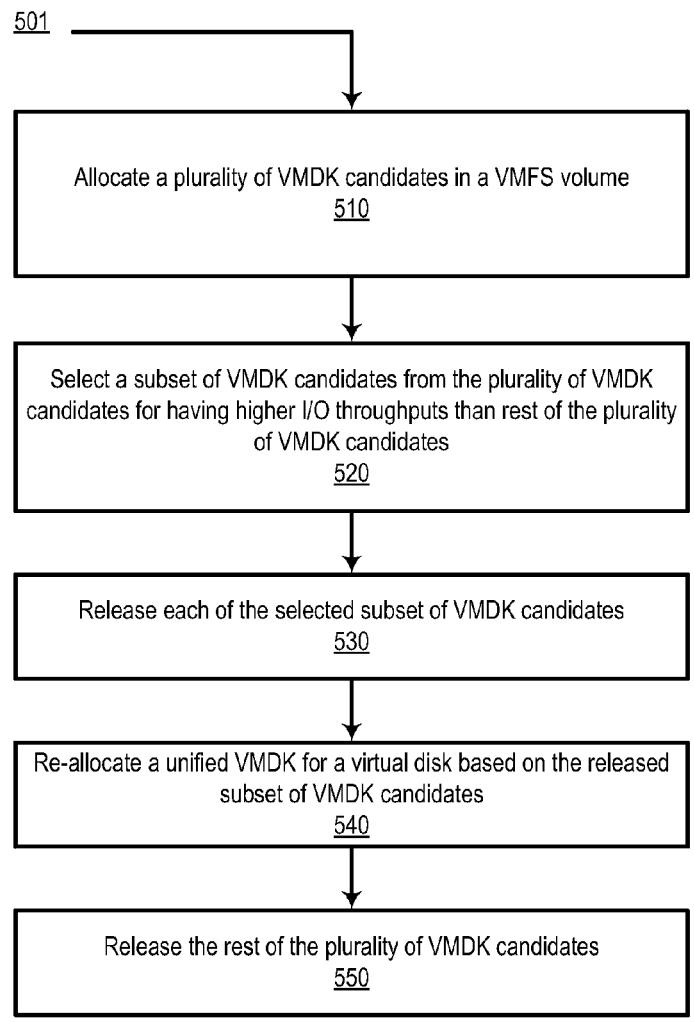
FIG. 5 shows a flow diagram illustrating one example process for performing big-data virtual disk allocation, all arranged in accordance with one or more embodiments of the present disclosure.

FIG. 5 shows a flow diagram illustrating one example process 501 for performing big-data virtual disk allocation, in accordance with one or more embodiments of the present disclosure. The process 501 sets forth various functional blocks or actions that may be described as processing steps, functional operations, events, and/or acts, which may be performed by hardware, software, and/or firmware. Those skilled in the art in light of the present disclosure will recognize that numerous alternatives to the functional blocks shown in FIG. 5 may be practiced in various implementations.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments. Moreover, one or more of the outlined steps and operations may be performed in parallel.

At block 510, a system, such as management server 140 of FIG. 1, is configured to allocate a plurality of VMDK candidates in a VMFS volume, which is supported by one or more physical hard disks. Further, each of the plurality of VMDK candidates may have a size that is calculated based on a size of the virtual disk to be allocated and a size of the VMFS volume. One example size for each VMDK candidate may correspond to the above discussed DeltaSize.

At block 520, management server 140 may select a subset of VMDK candidates from the plurality of VMDK candidates for having higher I/O throughputs than the rest of the plurality of VMDK candidates. The size of the selected subset also may depend on the requested size of the virtual disk. One example equation capturing this relationship, Equation (2), is detailed above. One approach of determining a performance score for each of the plurality of VMDK candidates is to aggregate the LBAs of the blocks in the physical hard disks underlying the plurality of VMDK candidates. As detailed above, a low aggregated value of the LBAs corresponds to high I/O throughput for the underlying physical hard disks. One example equation using the LBAs, Equation (1), is detailed above.

Another approach is to measure at run-time the I/O throughputs associated with the plurality of VMDK candidates and then assign performance scores corresponding to the measured I/O throughputs to the VMDK candidates. Then, in one embodiment, a ranking module of management server 140 may compare the performance scores of the plurality of VMDK candidates with each other and select the VMDK candidates having the best performance scores and meeting the size requirement of the selected subset.

Based on the selected subset of the VMDK candidates, management server 140 may proceed to allocate the big-data virtual disk. In one embodiment, at block 530, management server 140 may release each of the selected subset of the VMDK candidates. At block 540, management server 140 may reallocate a unified VMDK for the virtual disk based on the released subset of the VMDK candidates. At block 550, management server 140 may release the rest of plurality of VMDK candidates that are not included in the selected subset of the VMDK candidates.

In one embodiment, the VMFS volume may contain an in-use VMDK file that is associated with a higher I/O throughput than some of the plurality of VMDK candidates. In this case, management server 140 may reallocate the in-use VMDK file to another section of the VMFS volume corresponding to lower-performance physical hard disks. Specifically, a replacement VMDK file associated with the lower-performance physical hard disks may be allocated, and data in the in-use VMDK file is relocated to this replacement VMDK file. Then, the replacement VMDK file may be mounted to the virtual disk that originally utilizes the in-use VMDK file. In one embodiment, the in-use VMDK file may be treated as an empty VMDK and is compare with the plurality of VMDK candidates for performance. Alternatively, the in-use VMDK may be released, so that storage space in the VMFS volume that is previously occupied by the in-use VMDK may be reallocated for VMDK candidates of a fixed size, which may be based on the DeltaSize parameter.

Systems and methods for allocating a virtual disk for a virtual machine have been disclosed. The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

One or more embodiments of the present disclosure may be implemented as one or more computer programs or as one or more computer program modules embodied in one or more machine-readable storage media. The term machine-readable storage medium refers to any data storage device that can store data which can thereafter be input to a computer system and may be based on any existing or subsequently developed technology for embodying computer programs in a manner that enables them to be read by a computer system. Examples of a machine-readable storage medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The machine-readable storage medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A system configured to allocate a virtual disk for a virtual machine (VM), the system comprising a processor, a storage system, and a memory coupled with the processor, wherein the memory is configured to provide the processor with instructions for:

allocating a plurality of virtual machine disk file (VMDK) candidates in a virtual machine file system (VMFS) volume, wherein the VMFS volume is supported by one or more physical hard disks in the storage system;

selecting a subset of VMDK candidates from the plurality of VMDK candidates for having performance scores indicative of higher I/O throughputs associated with the one or more physical hard disks than rest of the plurality of VMDK candidates; and configuring the virtual disk based on the subset of the VMDK candidates.

2. The system of claim 1, wherein selecting the subset of VMDK candidates from the plurality of VMDK candidates comprises:

determining a size of the selected subset of VMDK candidates based on a size of the virtual disk; and calculating a corresponding performance score for the each of the plurality of VMDK candidates based on logical block addresses (LBAs) of the each of the plurality of VMDK candidates from the one or more physical hard disks.

3. The system of claim 1, wherein selecting the subset of VMDK candidates from the plurality of VMDK candidates comprises:

determining a size of the selected subset of VMDK candidates based on a size of the virtual disk;

mounting each of the plurality of VMDK candidates to a testing virtual disk in the VM;

performing I/O operations to access the testing virtual disk; and collecting performance measurements associated with the I/O operations for the plurality of VMDK candidates.

4. The system of claim 2, wherein calculating the corresponding performance score for the each of the VMDK candidates comprises:

aggregating the LBAs to generate a sum; and dividing the sum with a number of blocks in the one or more physical disks that correspond to the each of the VMDK candidates.

5. The system of claim 1, wherein configuring the virtual disk based on the selected subset of the VMDK candidates comprises:

releasing each of the selected subset of VMDK candidates; and reallocating a unified VMDK file based on the released subset of VMDK candidates for the virtual disk.

6. The system of claim 5, wherein configuring the virtual disk based on the selected subset of the VMDKs further comprises:

releasing the rest of plurality of VMDK candidates that are not included in the selected subset of the VMDK candidates.

7. The system of claim 1, wherein the VMFS volume includes an in-use VMDK file having a corresponding performance score indicative of a higher I/O throughput than some of the plurality of VMDK candidates, and allocating the plurality of VMDK candidates comprises:

moving data in the in-use VMDK file to a replacement VMDK file associated with the one or more physical hard disks having lower I/O throughputs; and releasing the in-use VMDK file from the VMFS volume.

8. The system of claim 1, wherein each of the plurality of VMDK candidates has a size that is calculated based on a size of the virtual disk and a size of the VMFS volume.

9. A method to allocate a virtual disk for a virtual machine (VM) in a virtualized computing system that includes one or more hosts, a storage system shared by the one or more hosts, and one or more management servers, the method comprising:

allocating a plurality of virtual machine disk file (VMDK) candidates in a virtual machine file system (VMFS) volume, wherein the VMFS volume is supported by one or more physical hard disks in the storage system;

selecting a subset of VMDK candidates from the plurality of VMDK candidates for having performance scores indicative of higher I/O throughputs associated with the one or more physical hard disks than rest of the plurality of VMDK candidates; and configuring the virtual disk based on the subset of the VMDK candidates.

10. The method of claim 9, wherein selecting the subset of VMDK candidates from the plurality of VMDK candidates comprises:

determining a size of the selected subset of VMDK candidates based on a size of the virtual disk; and calculating a corresponding performance score for the each of the plurality of VMDK candidates based on logical block addresses (LBAs) of the each of the plurality of VMDK candidates from the one or more physical hard disks.

11. The method of claim 9, wherein selecting the subset of VMDK candidates from the plurality of VMDK candidates comprises:

determining a size of the selected subset of VMDK candidates based on a size of the virtual disk;

mounting each of the plurality of VMDK candidates to a testing virtual disk in the VM;

performing I/O operations to access the testing virtual disk; and collecting performance measurements associated with the I/O operations for the plurality of VMDK candidates.

12. The method of claim 10, wherein calculating the corresponding performance score for the each of the VMDK candidates comprises:

aggregating the LBAs to generate a sum; and dividing the sum with a number of blocks in the one or more physical disks that correspond to the each of the VMDK candidates.

13. The method of claim 9, wherein configuring the virtual disk based on the selected subset of the VMDK candidates comprises:

releasing each of the selected subset of VMDK candidates; and reallocating a unified VMDK file based on the released subset of VMDK candidates for the virtual disk.

14. The method of claim 13, wherein configuring the virtual disk based on the selected subset of the VMDKs further comprises:

releasing the rest of plurality of VMDK candidates that are not included in the selected subset of the VMDK candidates.

15. The method of claim 9, wherein the VMFS volume includes an in-use VMDK file having a corresponding performance score indicative of a higher I/O throughput than some of the plurality of VMDK candidates, and allocating the plurality of VMDK candidates comprises:
  moving data in the in-use VMDK file to a replacement VMDK file associated with the one or more physical hard disks having lower I/O throughputs; and
  releasing the in-use VMDK file from the VMFS volume.

16. The method of claim 9, wherein each of the plurality of VMDK candidates has a size that is calculated based on a size of the virtual disk and a size of the VMFS volume.

17. A non-transitory machine-readable storage medium that includes a set of instructions which, in response to execution by a processor in a virtualized computing system, causes the processor to perform a method to allocate a virtual disk for a virtual machine (VM) in the virtualized computing system, the method comprising:
  allocating a plurality of virtual machine disk file (VMDK) candidates in a virtual machine file system (VMFS) volume, wherein the VMFS volume is supported by one or more physical hard disks in the storage system;
  selecting a subset of VMDK candidates from the plurality of VMDK candidates for having performance scores indicative of higher I/O throughputs associated with the one or more physical hard disks than rest of the plurality of VMDK candidates; and
  configuring the virtual disk based on the subset of the VMDK candidates.

18. The non-transitory machine readable storage medium of claim 17, selecting the subset of VMDK candidates from the plurality of VMDK candidates comprises:
  determining a size of the selected subset of VMDK candidates based on a size of the virtual disk; and
  calculating a corresponding performance score for the each of the plurality of VMDK candidates based on logical block addresses (LBAs) of the each of the plurality of VMDK candidates from the one or more physical hard disks.

19. The non-transitory machine readable storage medium of claim 17, wherein selecting the subset of VMDK candidates from the plurality of VMDK candidates comprises:
  determining a size of the selected subset of VMDK candidates based on a size of the virtual disk;
  mounting each of the plurality of VMDK candidates to a testing virtual disk in the VM;
  performing I/O operations to access the testing virtual disk;
  collecting performance measurements associated with the I/O operations for the plurality of VMDK candidates.

20. The non-transitory machine readable storage medium of claim 18, wherein calculating the corresponding performance score for the each of the VMDK candidates comprises:
  aggregating the LBAs to generate a sum; and
  dividing the sum with a number of blocks in the one or more physical disks that correspond to the each of the VMDK candidates.

21. The non-transitory machine readable storage medium of claim 17, wherein configuring the virtual disk based on the selected subset of the VMDK candidates comprises:
  releasing each of the selected subset of VMDK candidates; and
  reallocating a unified VMDK file based on the released subset of VMDK candidates for the virtual disk.

22. The non-transitory machine readable storage medium of claim 21, wherein configuring the virtual disk based on the selected subset of the VMDKs further comprises releasing the rest of plurality of VMDK candidates that are not included in the selected subset of the VMDK candidates.

23. The non-transitory machine readable storage medium of claim 17, wherein the VMFS volume includes an in-use VMDK file having a corresponding performance score indicative of a higher I/O throughput than some of the plurality of VMDK candidates, and allocating the plurality of VMDK candidates comprises:
  moving data in the in-use VMDK file to a replacement VMDK file associated with the one or more physical hard disks having lower I/O throughputs; and
  releasing the in-use VMDK file from the VMFS volume.

24. The non-transitory machine readable storage medium of claim 21, wherein each of the plurality of VMDK candidates has a size that is calculated based on a size of the virtual disk and a size of the VMFS volume.

* * * * *